United States Patent [19]

Fletcher

[11] Patent Number: 4,481,904

[45] Date of Patent: Nov. 13, 1984

[54] FISH CONSERVATION DEVICE

[76] Inventor: Richard I. Fletcher, Star Rte 61, Damariscotta, Me. 04543

[21] Appl. No.: 508,600

[22] Filed: Jun. 28, 1983

[51] Int. Cl.³ .............................................. E02B 8/08
[52] U.S. Cl. ........................................... 119/3; 405/81
[58] Field of Search .................... 119/3; 405/81, 2, 3, 405/103; 210/388, 297, 499

[56] References Cited

U.S. PATENT DOCUMENTS 2,826,897  3/1958  Vinsonhaler et al. ................ 405/81

FOREIGN PATENT DOCUMENTS 194006  7/1967  U.S.S.R. ............................... 405/81

Primary Examiner—Hugh R. Chamblee
Attorney, Agent, or Firm—Morgan, Finnegan, Pine, Foley & Lee

[57] ABSTRACT

This invention pertains to a fish conservation system for large water intake facilities, the system having one or more operating module. Each module includes a barrier screen or set of barrier screens and fish bypassing conduits located adjacent to the barrier screens. A reciprocating fish-herding screen or set of such reciprocating screens herds fish into the bypassing conduits and away from the barrier screens, against which the fish would otherwise be drawn and killed.

7 Claims, 10 Drawing Figures n EVEN, j ODD n EVEN, j EVEN n ODD, j ODD n ODD, j EVEN

FISH CONSERVATION DEVICE

This invention relates to the herding and removing of fish from the intake structures of facilities that draw water from natural sources and, more particularly, to an apparatus that enables indrawn fish to escape alive and unharmed from such structures.

BACKGROUND OF THE INVENTION

Certain industrial and public service facilities—such as power generating stations, pumped storage plants, public water supplies, ore processing plants, and pumped irrigation canals—require large supplies of water for their operations. As a rule, the required supplies of water are drawn off or diverted from such natural sources as rivers, lakes, estuaries, and coastal seawaters.

Fish that inhabit these natural water sources are regularly drawn into the intake structures of such facilities. Once indrawn, the fish tend to move with the water flow until they are blocked from further entrainment by barrier or "intake" screens. These barrier screens are universally employed as the means for preventing the passage of debris into the circulating systems of pumping facilities. Some barrier screens are stationary, but many are moved, or caused to "travel", in a vertical direction around driving sprockets after the manner of part of an endless belt. Whether stationary or travelling, the barrier screens prevent the further entrainment of indrawn fish (except for larvae or juveniles so small as to be extruded through the screen meshes). The indrawn fish remain trapped in the screenwells of these intake structures if not otherwise removed, eventually suffering injury or death from being pressed against a barrier screen or into its meshes by the force of the water flow.

Because actively swimming fish tend to align themselves parallel with the oncoming flow and headmost into it, they are moved rearwards toward the barrier screen. As the fish come into tailfirst contact with the screen they dart out and tend to stand against the flow in the region just in front of the screenface. In so stemming the force of the oncoming flow, the fish increase their swimming efforts and become progressively exhausted by their increased rates of energy expenditures. Over the course of time the spent fish are pressed onto the barrier screen by the force of the flow and killed.

Many attempts have been made at reducing injury and death to fish drawn into water intake systems. Certain nonmechanical schemes have been employed with the thought to inducing the entry of fish into bypassing conduits or to frightening the fish away prior to entrapment. All known strategems of that kind—such as sound waves, bubble curtains, strobe lights, water jets, shock waves, chemical repellents, and electricity—have proved ineffective in full-scale systems.

Various mechanical devices have also been tried and found wanting, either through mechanical impracticalities or because of an ultimate lack of effectiveness in saving fish. In one experimental demonstration, for example, a travelling barrier screen was repositioned so as to move laterally across the flow, its frontmost side driven in the direction of a bypassing slot located at one end of the moving screen. Although effective in conveying small fish toward the bypassing slot, the device was found to be unsound at the scale of industrial intake structures. Mechanical limitations also prohibit the enlargement of such small-scale devices as wedge-wire cylinders and similar rotating mechanisms.

At some water intake facilities, vertical travelling screens have been equipped with troughs, the aim being the direct removal of fish through the scooping action of the troughs. Field tests on this modification have not shown it to be uniformly better at conserving fish than conventional travelling screens.

Some intake structures have been equipped with passive "guiding" barriers, usually in the form of vertical metal louvres or conventional barrier screens, placed diagonally across the intake flume and leading to a narrow bypassing slot located at the apex of the acute angle between the barrier and the wall of the flume. In tests on most louvre arrays, the majority of the test fish were drawn directly through the louvre openings and into the pumps of the intake system. Only when the louvre vanes were shaped in such a way as to create a strong local turbulence did the majority of the fish, in apparent reaction to the turbulent front, find their way to the bypassing slot. But turbulent louvre arrays have not been applied to industrial facilities because of the accompanying losses in pumping efficiency. The turbulence that impedes the passage of fish through the louvre openings also impedes the flow of water into the intake system, thus decreasing the volumetric intake to unacceptable levels of efficiency.

With conventional barrier screens set at an angle to the flow—as with the same screens set normal to the flow—the indrawn fish tend to stand head-on against the current, and only through chance do they encounter the bypassing slot. Owing to the randomness of fish movement and the infrequency of encounter with the bypassing slot, the fish mortalities associated with angled barrier screens are usually very high.

The objective with this invention, therefore, is the creation of a system for diverting fish from pumped intake structures and returning them unharmed to the natural water bodies from whence they came.

A further objective of this invention is to make possible a method for herding fish rapidly into zones of withdrawal and away from barrier screens, against which they would otherwise be drawn and killed.

A further objective associated with this invention is the conserving of fishlife and the maintaining of indigenous species in their natural habitats despite the presence of large pumping facilities.

Summary of the Invention

In the system according to the invention the water intake is constructed with barrier screens generally normal to the direction of water flow with pumped bypass conduits located adjacent to the sides of the barrier screens. Moving fish-herding screens, perpendicular to the plane of the barrier screens, are located at the fronts of the barrier screens. The fish-herding screens are moved in a manner which herds the fish from the fronts of the barrier screens toward the bypass conduits. In systems incorporating multiple barrier screens and herding screens, adjacent fish-herding screens preferably move in a cooperative motion either toward one another or away from one another. Thus, when moving toward one another adjacent fish-herding screens herd fish into the same bypass conduit located between adjacent barrier screens. Similarily, when adjacent fish-herding screens move away from one another, they move either toward another fish-herding screen or toward a flume wall to likewise herd fish to the entrance of a bypass conduit. The moving fish-herding screens serve to herd fish into the bypass conduits. These fish would otherwise be entrapped in the water intake area in front of the barrier screens.

BRIEF DESCRIPTION OF THE FIGURES

FIGS. 6a and 6b are plan views that depict the synchronous motions of the n-many herding screens when n is odd.

DETAILED DESCRIPTION OF THE PREFERRED EMBODIMENTS

The invention is a fish herding and conservation system for water intake structures. The preferred embodiment includes:

(a) a water-intake structure having n-many intake bays or sets of intake bays through which water can flow, with walls, parallel to the water flow, that bound the intake structure at its extreme ends; n+1 pumped bypassing conduits whose open ends face into the water flow; n-many barrier screens or sets of barrier screens, located normal to the axes of the intake bays and hence normal to the inflowing water, and which are bounded by the bypassing conduits;

(b) n-many fish-herding screens, each of a height sufficient to span the water depth of the intake structure, and each of which is constrained to move from side to side across the barrier screens while maintaining a perpendicular orientation to the plane of the barrier screen surface; and (c) a means for driving said herding screens in such a way as to move each herding screen in a reciprocating pattern of motion along the surface plane of its associated barrier screen or set of barrier screens, and where, for every excursion, the herding screen moves from a bypass at one end of a barrier screen to a bypass at the opposite end so that fish indrawn by the water flow are herded away from the barrier screens and into a bypassing zone.

Preferably, if n is greater than unity, each herding screen, in following its reciprocating pattern, is moved synchronously with and in the direction opposite to that of the adjacent herding screen.

Figure 1:
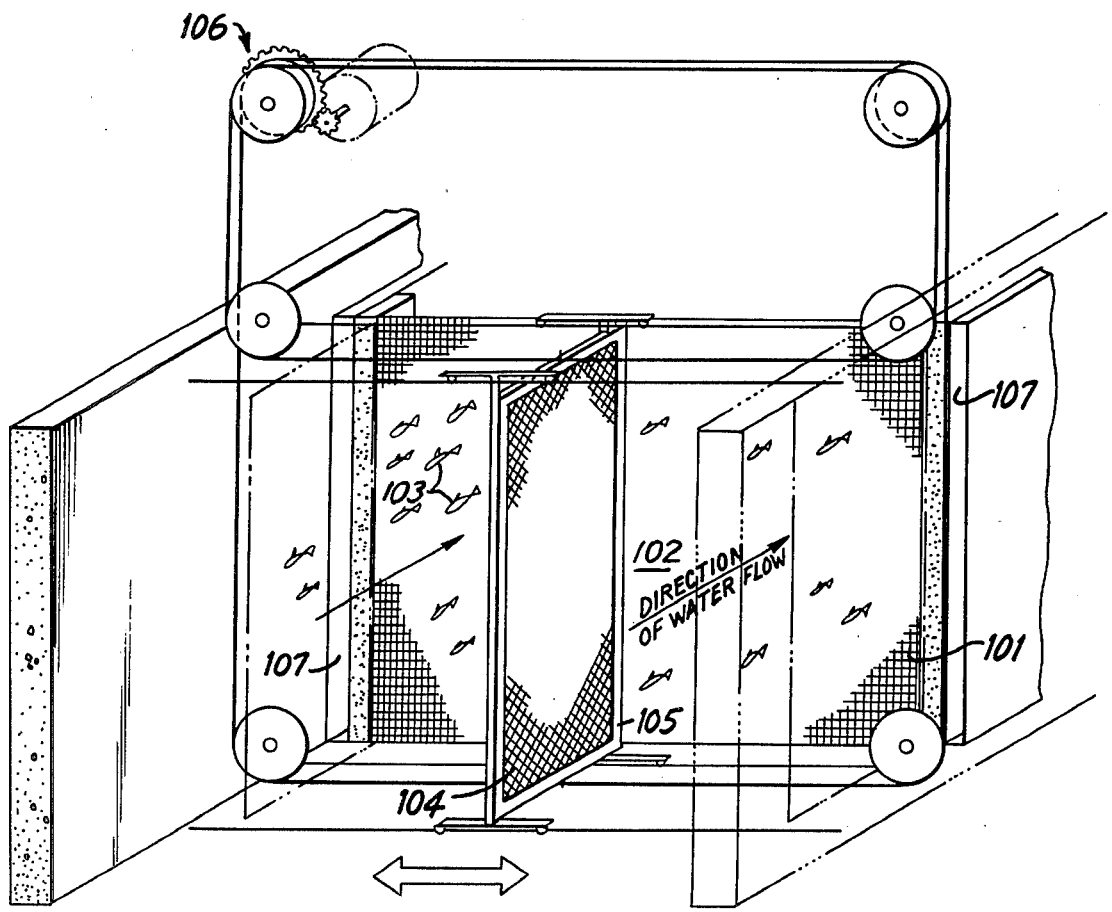
FIG. 1 is a perspective view of a single-module embodiment of the fish-herding apparatus of this invention.

FIG. 1 shows the preferred embodiment of the system where n=1, there being one barrier screen, 101, situated normal to the direction of the water inflow 102. Fish 103 are entrained by inflow 102 and drawn from the source waters into the intake structure toward barrier screen 101. The indrawn fish tend to stand headmost against inflow 102 in the region immediately along the front of barrier screen 101. The herding screen, 104, is moved and guided by driving mechanism 106 in such a way as to traverse the face of barrier screen 101, and is always perpendicular to the barrier screen and parallel with the water inflow 102. The inward edge, 105, of the herding screen remains as close to the face of barrier screen 101 as operating limitations allow. The lateral motion of herding screen 104 elicits a natural but directed avoidance response from the entrapped fish 103, the result of which is a herding or net lateral displacement of the fish away from the vicinity of barrier screen 101 and into the vicinity of either of the pumped bypassing conduits, 107, which are located at the extreme ends of barrier screen 101. The fish 103 are withdrawn from the screenwell in the current induced by the pumping actions of conduits 107, and from there they are returned to the source waters by way of the bypassing conduits.

Figure 2A:
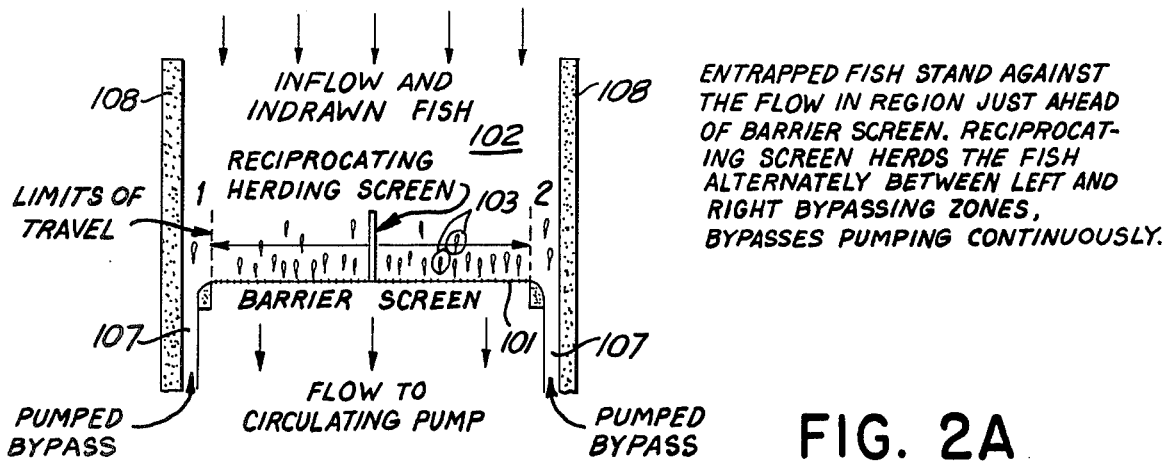
FIGS. 2a, 2b, and 2c are plan views that depict the reciprocating motion and fish-herding action of the single module embodiment of this invention.
Figure 2B:
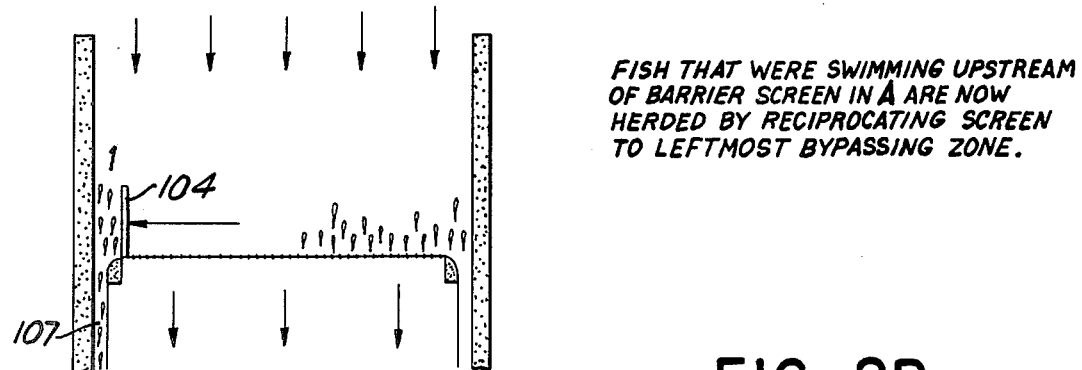
Figure 2C:
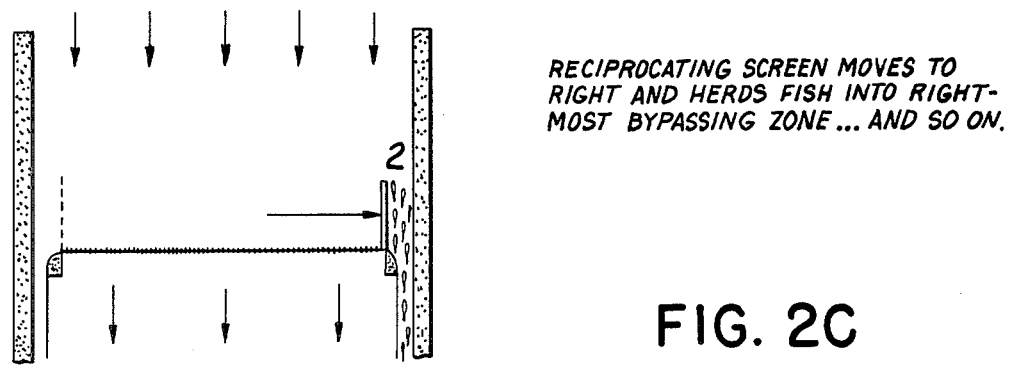

FIGS. 2a, 2b, and 2c are plan views of the single-module intake structure depicted in FIG. 1. FIG. 2a shows the structure as the entrapped fish 103 are drawn tailfirst towards the barrier screen 101 by the inflowing water 102. The fish, in stemming the current, tend to stand headmost against the flow in the region immediately ahead of the barrier screen 101. The intake bay is bounded by flume walls 108, against which the bypassing conduits 107 are located. The barrier screen 101 is bounded in turn by the pumped bypassing conduits. Herding screen 104 moves repeatedly from end to end of the barrier screen 101 in a slow sweeping motion, to the effect that the entrapped fish 103, otherwise in danger of being drawn against the barrier screen, are herded into the pumped bypassing conduits. FIG. 2b shows herding screen 104 after having moved to its leftmost position, in the vicinity of the leftmost of the two bypassing conduits 107, FIG. 2c shows herding screen 104 in its rightmost position, the herding screen 104 having swept across barrier screen 101 from side to side and thus herded the indrawn fish into the bypassing conduits.

Figure 3:
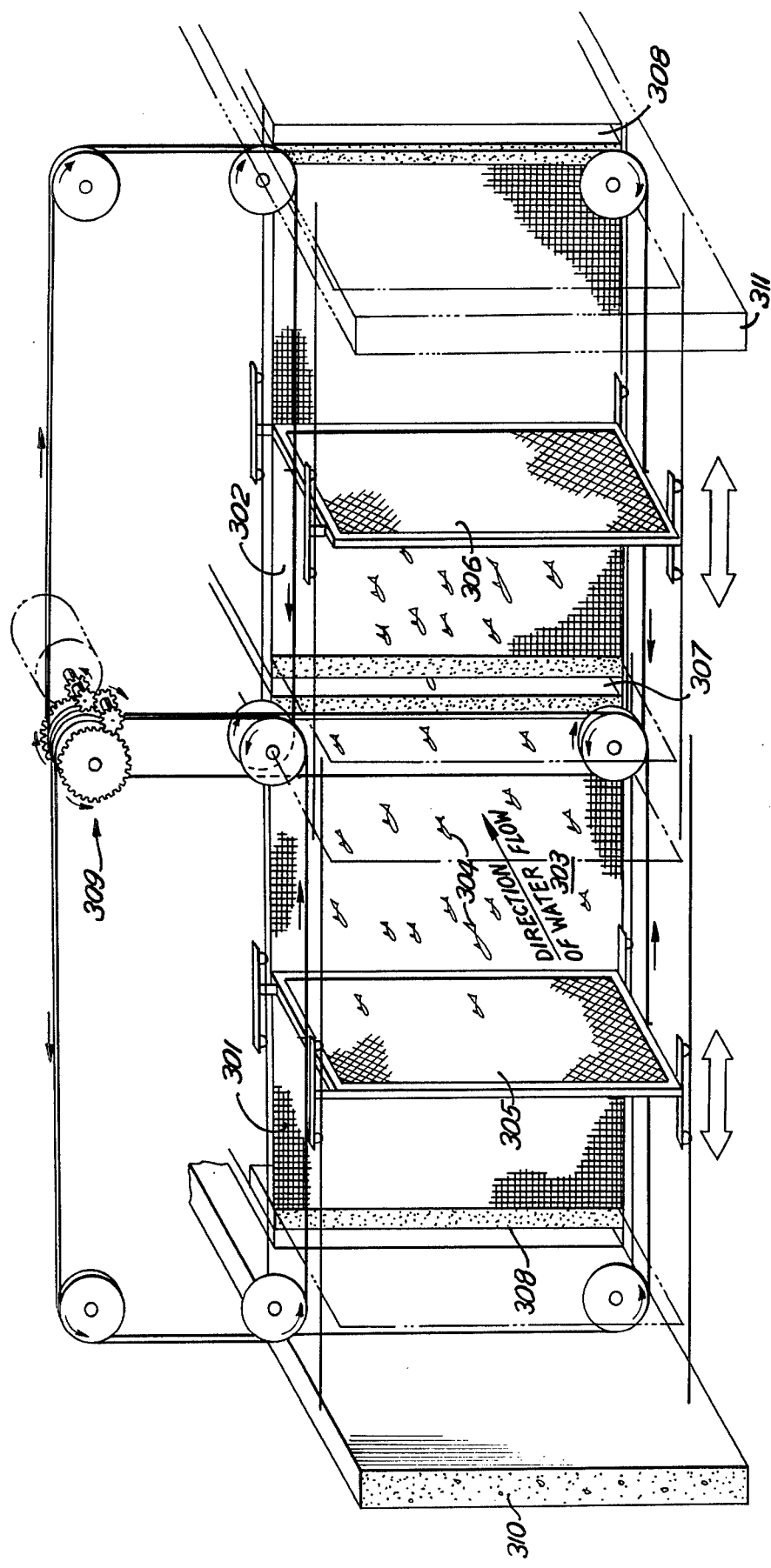
FIG. 3 is a perspective view of a double-module embodiment of this invention.

FIG. 3 shows the preferred embodiment of the system where n=2, there being two barrier screens, 301 and 302, again situated normal to the direction of the water inflow 303. The indrawn fish 304, as shown, tend to stand headmost against the flow in the region immediately in front of the barrier screens. Herding screens 305 and 306 are guided and moved by a drive mechanism, 309, so as to traverse the faces of the barrier screens in a reciprocating and synchronous fashion so that the herding screens either move toward one another or away from one another. In the first instance, the herding screens move towards one another and into the vicinity of the centermost bypass 307. As a consequence of this pattern of motion of the herding screens, the entrapped fish 304 are induced to move laterally along the fronts of the barrier screens 301 and 302 and towards the center bypass. The simultaneous arrival of herding screens 304 and 305 on either side of bypass 307 thus creates a zone of concentration from whence the herded fish are withdrawn by the induced current of the pumped bypass. On the following half-cycle of their reciprocating motions, the herding screens are moved simultaneously towards the outermost bypasses 308—screen 305 towards the bypass that lies between barrier screen 301 and flume wall 310, and screen 306 towards the bypass that lies between barrier screen 302 and flume wall 311. On this half-cycle of motion, the fish are induced to move laterally toward the outermost bypasses 308. In this instance, a zone of concentration is created at each of the outermost bypasses 308 from each of which the herded fish are withdrawn by the induced currents of the pumped bypasses.

Figure 4:
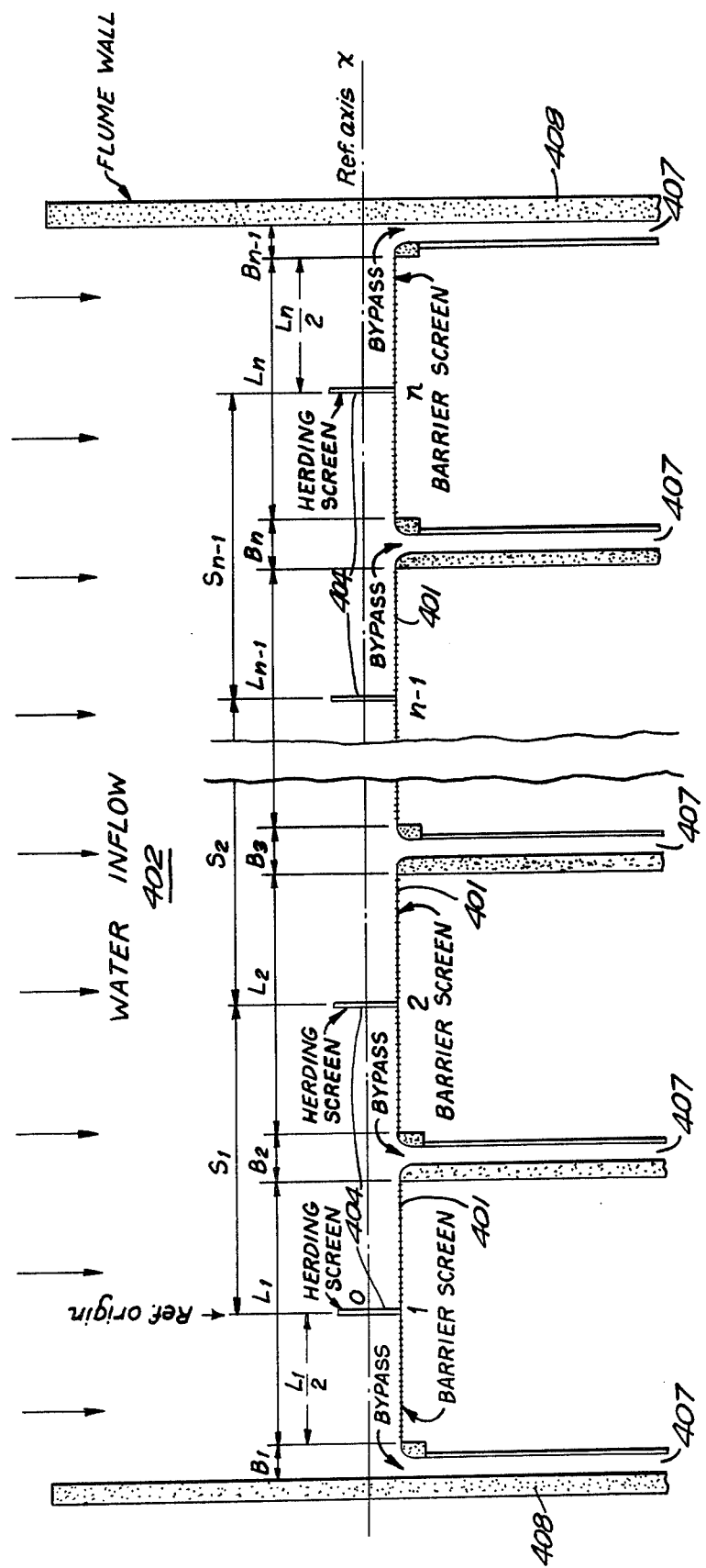
FIG. 4 is a dimensional reference diagram, in plan view, of the general n-module embodiment of this invention.

FIG. 4 is a dimensional reference diagram of the general n-module embodiment of this invention. The n-many herding screens, 404, and their associated barrier screens, 401, are numbered in the ordinal sequence 1, ..., i, ..., n along a reference axis x that extends across the intake flume and parallel to the faces of the barrier screens. For convenience of reference, herding screen "1" is shown on the diagram in a "starting" or initial position exactly at the center of its associated barrier screen and coincident with the origin O of displacement axis x. The barrier screens 401, of widths $L_i$, are separated from one another and from the flume walls 408 by n+1 bypassing structures, 407, of widths $B_i$. For the initial condition depicted by the diagram, the herding screens are separated from one another by distances $S_i$, where $$S_i = \frac{L_i + L_{i+1}}{2} + B_{i+1}$$

As described and depicted previously by FIGS. 1, 2, and 3, the intake structure, incorporating n-many intake bays, is bounded at its extreme ends by flume walls 408. The inflowing water 402 is drawn from an external source and flows more or less parallel to the flume walls 408, through barrier screens 401, and into the circulating pumps of the pumping facility. Inflowing water is also pumped into each of the bypassing conduits 407. Fish from the source water are drawn into the structure more or less continuously by the water inflow, and, upon encountering the barrier screens 401, tend to stem the current in the region just in front of the barrier screens. Each of the n-many herding screens 404 is constrained to move laterally from side to side of a barrier screen and always perpendicular to the plane of its surface. During any period of motion, herding screens 404 are displaced along reference axis x, the ith screen moving in the direction opposite to that of the (i+1)th screen.

The synchronous boundary conditions for the reciprocating motion and displacement x of the general ith herding screen are $$x_i = 0 \text{ at } t = (2j - 1)\frac{\pi}{2\omega}, j = 1,2,3, \ldots \quad [1]$$

where $$x_i(t) = \frac{L_i}{2}(-1)^{i-1} \sin \omega t + \sum_{k=1}^{i-1} S_k, \quad [2]$$

Figure 5A:
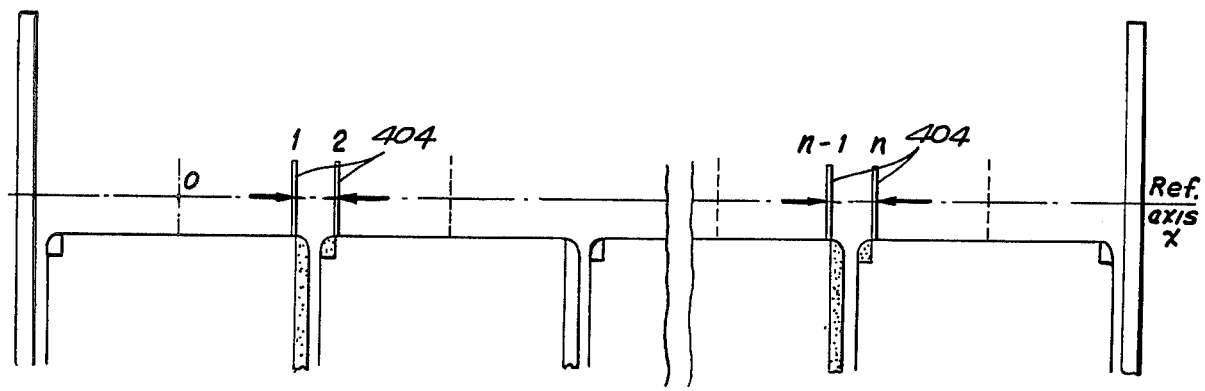
FIGS. 5a and 5b are plan views that depict the synchronous motions of the n-many herding screens when n is even.
Figure 5B:
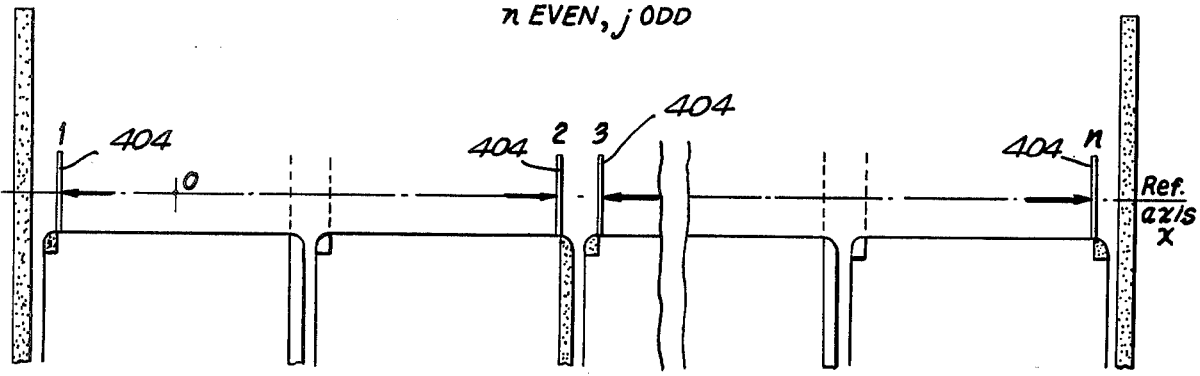

$\omega t$ in radians; $\omega$ and $t$ in similar units of time. The mean transit or excursion velocity of the ith herding screen from side to side of its associated barrier screen (over the time increment $t_{j+1} - t_j$) need only be $$|\bar{v}_i| = \frac{\omega L_i}{\pi} \quad [3]$$

irrespective of its acceleration between times $t_j$ and $t_{j+1}$. FIGS. 5a and 5b depict the synchronous pattern of motion of the n-many herding screens 404 of FIG. 4 when n is even. FIG. 5a shows the positions of the herding screens when $x_i = 0$ and j is odd in $t = (2j-1)\pi/2\omega$. FIG. 5b shows the positions of the herding screens when $x_i = 0$ and j is even.

Figure 5C:
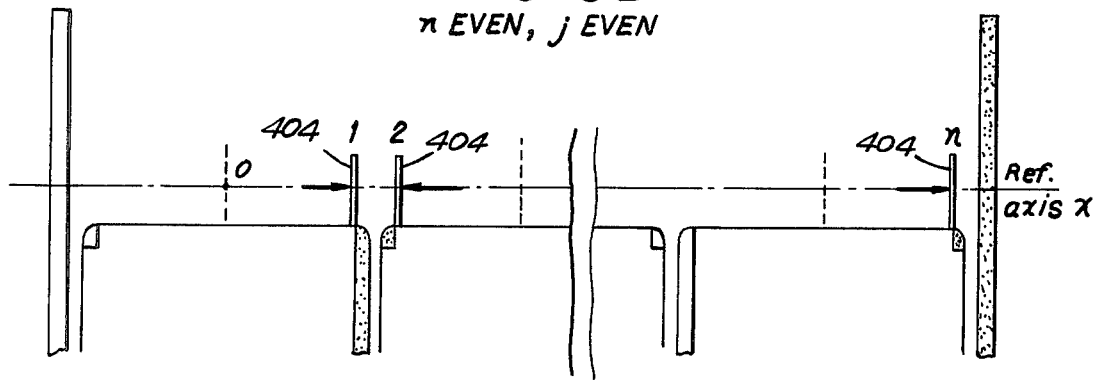
Figure 5D:
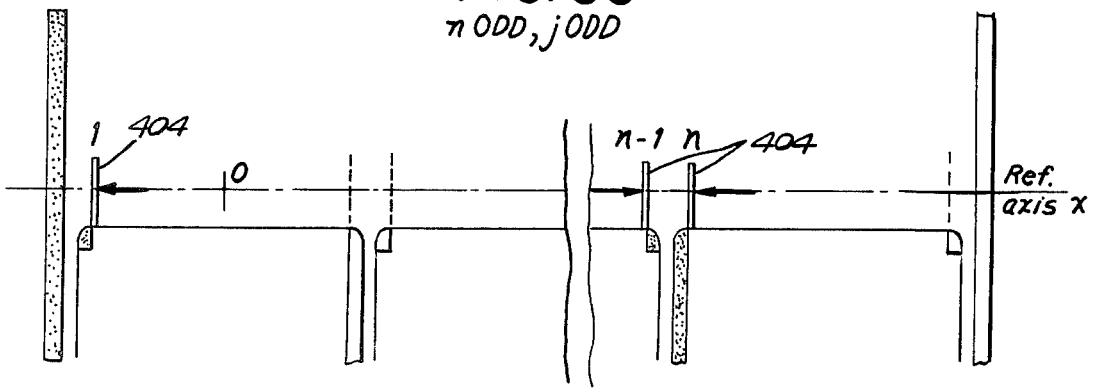

FIG. 5c and 5d depict the synchronous pattern of motion of the n-many herding screens 404 of FIG. 4 when n is odd. FIG. 5c shows the positions of the herding screens when $x_i = 0$ and j is odd in $t = (2j-1)\pi/2\omega$. FIG. 5d shows the positions of the herding screens when $x_i = 0$ and j is even.

For all combinations of herding screens, barrier screens, and bypasses, whether in single or multiple configurations, the herding screens may be mounted on or suspended from guiding tracks in any fashion that constrains their orientations and motions to the manner and intents heretofore described. The means for imparting motion to a herding screen or a combination of herding screens may be a motor-powered chain driving mechanism, so geared and so accomodated by sprockets as to pull the herding screens to and fro along the guiding tracks in accordance with the motion equations [1], [2], and [3].

In all the described and implied configurations of this invention, the fish bypasses are actively pumped for the purpose of drawing entrapped fish out from the intake structure. The fish so withdrawn are returned by suitable conduits or sluices to the natural waters from whence they came, but to a location or locations of those source waters where the returned fish are less likely to be recaptured by the intake system.

While several prefered embodiments have been described in detail for the purpose of illustrating the concepts of the invention, there are numerous variations in mechanical arrangements and mechanisms which could be employed without departing from the scope of the invention. The scope of the invention is more particularly defined in the appended claims.

What is claimed is:

1. Apparatus for herding and conserving fish, comprising:
   (a) sidewalls defining an intake area through which water can flow;
   (b) means defining at least one bypass conduit adjacent to one of said sidewalls with an open end facing into said intake area to admit fish otherwise entrapped in said intake area;
   (c) a barrier screen oriented generally normal to the direction of water flow and located adjacent to said bypass conduit;
   (d) a fish-herding means of a height sufficient to span the water depth of said intake area, said fish-herding means being constrained to move across the face of said barrier screen while maintaining an orientation perpendicular to the plane of said barrier screen; and
   (e) means for driving said fish-herding means for movement across the surface of said barrier screen toward said bypass conduit so that fish entrapped in said intake area are herded away from said barrier screen into said bypass conduit.

2. Apparatus according to claim 1 including a separate bypass conduit adjacent to each vertical sidewall of said intake area.

3. Apparatus according to claim 1 including a plurality of barrier screens and a bypass conduit between adjacent ones of said barrier screen and between said barrier screens and said sidewalls.

4. Apparatus according to claims 1, 2 or 3 wherein said fish-herding means is in the form of a moving screen.

5. Apparatus for herding and conserving fish comprising:
   (a) sidewalls defining a water-intake area;

(b) a plurality of barrier screens oriented generally perpendicular to the direction of water flow;

(c) a bypass conduit between each vertical sidewall and the adjacent one of said barrier screens and a bypass conduit between adjacent barrier screens, said bypass conduits each having an open end facing into said intake area for admitting fish otherwise entrapped in said intake area;

(d) a fish-herding screen associated with each of said barrier screens, each of said fish-herding screens being of a height sufficient to span the water depth of said intake area, and being constrained to move laterally across the face of said barrier screen while maintaining an orientation perpendicular to the planes of said barrier screens;

(e) means for driving said fish-herding screens in a reciprocating motion in such a way that adjacent fish-herding screens move either toward one another or away from one another so that when moving toward one another said fish-herding screens move fish into zones of concentration in front of the bypass conduit between the associated barrier screens.

6. Apparatus for herding and conserving fish, comprising:

(a) sidewalls defining an intake area through which water can flow;

(b) means defining a separate bypass conduit adjacent each of said sidewalls with an open end facing into said intake area to admit fish otherwise entrapped in said intake area;

(c) a barrier screen oriented generally normal to the direction of water flow and located adjacent to said bypass conduit;

(d) a fish-herding means of a height sufficient to span the water depth of said intake area, said fish-herding means being constrained to move across the face of said barrier screen while maintaining an orientation perpendicular to the plane of said barrier screen; and (e) means for driving said fish-herding means for movement across the surface of said barrier screen toward said bypass conduit so that fish entrapped in said intake area are herded away from said barrier screen into said bypass conduit, and (f) wherein said means for driving said fish-herding means moves said fish-herding means laterally in a reciprocating motion.

7. Apparatus for herding and conserving fish, comprising:

(a) sidewalls defining an intake area through which water can flow;

(b) a plurality of barrier screens oriented generally normal to the direction of water flow;

(c) means defining a bypass conduit between adjacent ones of said barrier screens and between said barrier screens and said sidewalls, said bypass conduit having an open end facing into screens and said intake area to admit fish otherwise entrapped in said intake area;

(d) a fish-herding means of a height sufficient to span the water depth of said intake area, said fish-herding means being constrained to move across the face of said barrier screen while maintaining an orientation perpendicular to the plane of said barrier screen; and (e) means for driving said fish-herding means for movement across the surface of said barrier screen toward said bypass conduit so that fish entrapped in said intake area are herded away from said barrier screen into said bypass conduit, and (f) wherein said means for driving said fish-herding means moves said fish-herding means laterally in a reciprocating motion.

* * * * *